United States Patent [19]
Götz

[11] Patent Number: 5,542,884
[45] Date of Patent: Aug. 6, 1996

[54] MECHANICAL OVERLOAD PROTECTION DEVICE FOR MACHINES, PARTICULARLY JAW CRUSHERS

[75] Inventor: Bruno Götz, Oedheim, Germany

[73] Assignee: Paul Bohringer, Oedheim, Germany

[21] Appl. No.: 303,359

[22] Filed: Sep. 9, 1994

[30] Foreign Application Priority Data

Sep. 9, 1993 [DE] Germany .............................. 9313633 U

[51] Int. Cl.[6] ............................. F16H 35/10; B02C 25/00
[52] U.S. Cl. ............................................................. 464/36
[58] Field of Search .................................. 464/36, 38, 30; 192/56 R

[56] References Cited

U.S. PATENT DOCUMENTS

| | | | |
|---|---|---|---|
| 2,490,172 | 12/1949 | Swahnberg | 464/36 X |
| 3,270,844 | 9/1966 | Orwin | 192/56 R X |
| 4,174,621 | 11/1979 | Woltjen . | |
| 4,263,996 | 4/1981 | Putney | 464/36 X |
| 4,750,685 | 6/1988 | Frei | 192/56 R X |

FOREIGN PATENT DOCUMENTS

| | | |
|---|---|---|
| 1761856 | 2/1958 | Germany . |
| 2934164 | 3/1980 | Germany . |

*Primary Examiner*—Daniel P. Stodola
*Assistant Examiner*—Emmanuel M. Marcelo
*Attorney, Agent, or Firm*—Jacobson, Price, Holman & Stern, PLLC

[57] ABSTRACT

An overload protection device for operating machines, the device having two coupling parts which are in one condition, a coupled condition, force-interlocked by coupling bodies, until a threshold force is exceeded, at which point coupling is released. The coupling parts have mutually facing surfaces provided with depressions and guide grooves for the coupling bodies. The coupling bodies are rolling elements, e.g., spheres, which when threshold force is overcome, move into the guide grooves causing release of the coupling parts from force-interlock thereby permitting rotational movement of the parts relative to each other.

12 Claims, 5 Drawing Sheets

MECHANICAL OVERLOAD PROTECTION DEVICE FOR MACHINES, PARTICULARLY JAW CRUSHERS

This invention relates to a mechanical overload protection device for machines which have a drive motor, an operating machine driven by the drive motor, and an overload protection means included in the drive train whereby when an overload of the operating machine occurs the operating machine is uncoupled from the drive motor.

BACKGROUND OF THE INVENTION

Numerous machines need protection against overload, to prevent the machines from serious damage in the event of operating irregularities. Thus, for example, overload switching devices are installed in electric motors, whereby when the current rises to a high level the motor is shut off from the power source. As another example, conveyors typically have fluid couplings with melting plug elements or the like installed in the coupling housing, whereby if the coupling fluid is overheated the plug melts and allows the fluid to flow out, thereby removing the torque transmission means. In the case of strictly mechanical force transmission, the coupling may be provided with so-called "shear bolts" which break when the allowable torque is exceeded. Also known are spring-preloaded jaw-clutch or gear couplings whereby when the admissible torque is exceeded the interengaging teeth of the coupling yield axially to interrupt the torque transmission process but still serve to prevent undisturbed coasting of the flywheel mass.

In the case of double-toggle-joint jaw crushers, pressure plates are used as overload protection means. The pressure plate has a defined weak locus where when the crusher becomes blocked the pressure plate breaks.

The known thermal overload protection means (e.g., overload switches and melting devices) have the disadvantage of slow response, such that they are incapable of protecting the operating machine in the face of sudden blocking. Thermal overload protection means applied to operating machines which machines have high flywheel mass are even less effective.

Jaw-clutch couplings, comprising two opposing clutch pieces connected form-interlockingly with the aid of spring means, are known to have the advantage of rapidly interrupting the drive train when a prescribed overload transmission torque is reached or exceeded. However, they have the disadvantage of not allowing coasting, because an inherent feature of the design is that the coupling immediately reengages, following which it will be reinterrupted. This is the so-called "chatter" effect.

Other known strictly mechanical overload protection devices, e.g., shear bolts and pressure plates, also work very rapidly and produce interruptions even in the presence of large flywheel masses which interruptions disconnect the operating machine from the drive means rapidly enough to prevent damage. However, they have the drawback that the protective means are destroyed at the location in which they have been installed. The mechanically destroyed parts must be replaced, so that the machine often cannot be restarted until lengthy work has been performed on the protection system.

Accordingly, the underlying problem of the present invention is to devise an overload protection device which responds rapidly in the fashion of known mechanical overload proreaction devices but without damage and with rapid restart capability. During the overload the machine should be isolated from the drive means continuously and without reaction, until the drive and the flywheel mass have stopped.

SUMMARY OF THE INVENTION

This problem is solved in a system of the type described initially supra, in that the overload protection means comprise a coupling having a driving coupling part and a driven coupling part; further in that the coupling parts are rotatable with respect to each other and are force-lockingly (non-positively) connected by means of a plurality of coupling bodies; and in that the coupling bodies are held in the coupling position under a spring force which determines the limiting force of the force-interlock, whereby when the limiting force is exceeded (e.g., when the driven coupling part experiences a block) the coupling bodies can undergo a transition (e.g., be moved) to a disengaged position in which the force-interlock is released.

It may be appreciated that this overload protection device, similarly to previous mechanical overload protection devices, provides maximal protection of the operating machine against damage when obstacles to movement are encountered, in that the device releases rapidly under such circumstances, and achieves essentially complete mechanical separation of the working machine from the drive train. This is achieved by means which are non-destructive, i.e., do not involve destruction of elements of the system, and which allow easy and simple reengagement. An important feature of the device of the present invention is that it is in principle a rigid coupling; namely, it is rigid up to a limiting force of the force-interlock, the value of which force can be chosen, in that the two coupling parts which are mutually rotatable are interconnected by force-interlocking means employing the above-mentioned coupling bodies. When the limiting force of the force-interlock is exceeded, e.g., in the event of blocking of the operating machine, the coupling bodies are moved and the rigid coupling is converted to a disengaged position in which the blocked operating machine can persist motionless and the drive can continue to run without suffering damage.

In a preferred embodiment of the present invention, the coupling bodies may comprise three rolling elements disposed at an equiangular separation around the axis. In a particularly simple case, they may comprise spheres. The coupling bodies, e.g., the spheres, may be accommodated in depressions in the mutually facing surfaces of the driving and driven coupling parts, whereby in the normal case, i.e., not being subjected to an overload, a rigid connection between the two coupling parts is provided, such that force i.e., torque transmission is ensured. If and when the limiting force-interlocking (i.e., torque) is exceeded, the rolling elements will move out of the depressions holding them, and the two coupling parts will then be free to rotate with respect to each other.

In a preferred aspect of the present invention, guideways for the coupling bodies are provided which guideways adjoin the above-described depressions. The guideways may be, e.g., guide grooves for the rolling elements, which grooves are machined into the coupling parts. This makes it possible to guide the rolling elements after they are released, i.e., after they leave the depressions, such that the coupling can be held in readiness to reengage, which reengagement will be by reentry of the rolling elements into respective depressions, e.g., the reengagement may be brought about merely by reversing the drive. Further, if the depressions are connected by guideways to a circular groove for the rolling elements, a rotational path may be created wherein the rolling elements may run after they are disengaged from the depressions in the case of blocking of the driven coupling part, such that the driving coupling part will continue to run. It is envisaged that the rolling elements would be guided in a race which will also maintain their angular separation as they travel in the circular groove, thereby facilitating the reengagement process.

The force-interlock with a limiting force is made adjustable by the use of a pre-stressing device, e.g., cup springs, which device presses the two coupling parts together, with the adjustment being in particular adjusting for a greater or lesser pressing force by means of the tightening of an adjusting screw. In this way, the limiting force of the force-interlock, and thereby the limiting torque for releasing the coupling, can be preadjusted as required, by adjusting the pressing force.

It is seen that the overload protection device of the present invention is free of slippage and wear in the normal operating state, i.e., when the parts are not moving with respect to each other. If the operating machine becomes blocked, the operating-machine-side part of the coupling, viz, the driven half of the coupling, stops as well. The flywheel mass of the drive, which serves as an energy storage means and has a correspondingly large moment of inertia, causes the driving coupling part to continue rotating. This causes the coupling bodies to be dislodged from their seats or in the depressions, against the action of the pre-stressing device (e.g., against the compressive force of, and with further compression of, the springs), whereby the coupling bodies are maintained on exactly defined guideways; thence coupling bodies, which are in the form of bodies as previously discussed, e.g., rolling elements, allow the driving-side flywheel mass to coast until it stops (assuming that the drive motor has been shut off or has been decoupled from said mass as well), such coasting occurring even though the operating machine has been blocked.

The source of the blockage of the operating machine can then be eliminated without difficulties, after which the drive is reversed, causing the coupling bodies to be guided back over their guideways and into the seats or depressions, where they will be held by the pressing force of the springs and will remain there until another disturbance arises, i.e., until the limiting force/torque of the coupling is again exceeded. Thus, this reversal of the drive enables the drive train up to the operating machine to be reengaged, rapidly and easily, whereby operation of the operating machine is resumed.

Additional details, advantages, and features of the invention will be apparent from the following description of the drawings. For purposes of disclosing essential features of the invention, all features of the drawings not explicitly referred to hereinbelow are incorporated herein by reference.

DESCRIPTION OF THE PREFERRED EMBODIMENT

Figure 1:
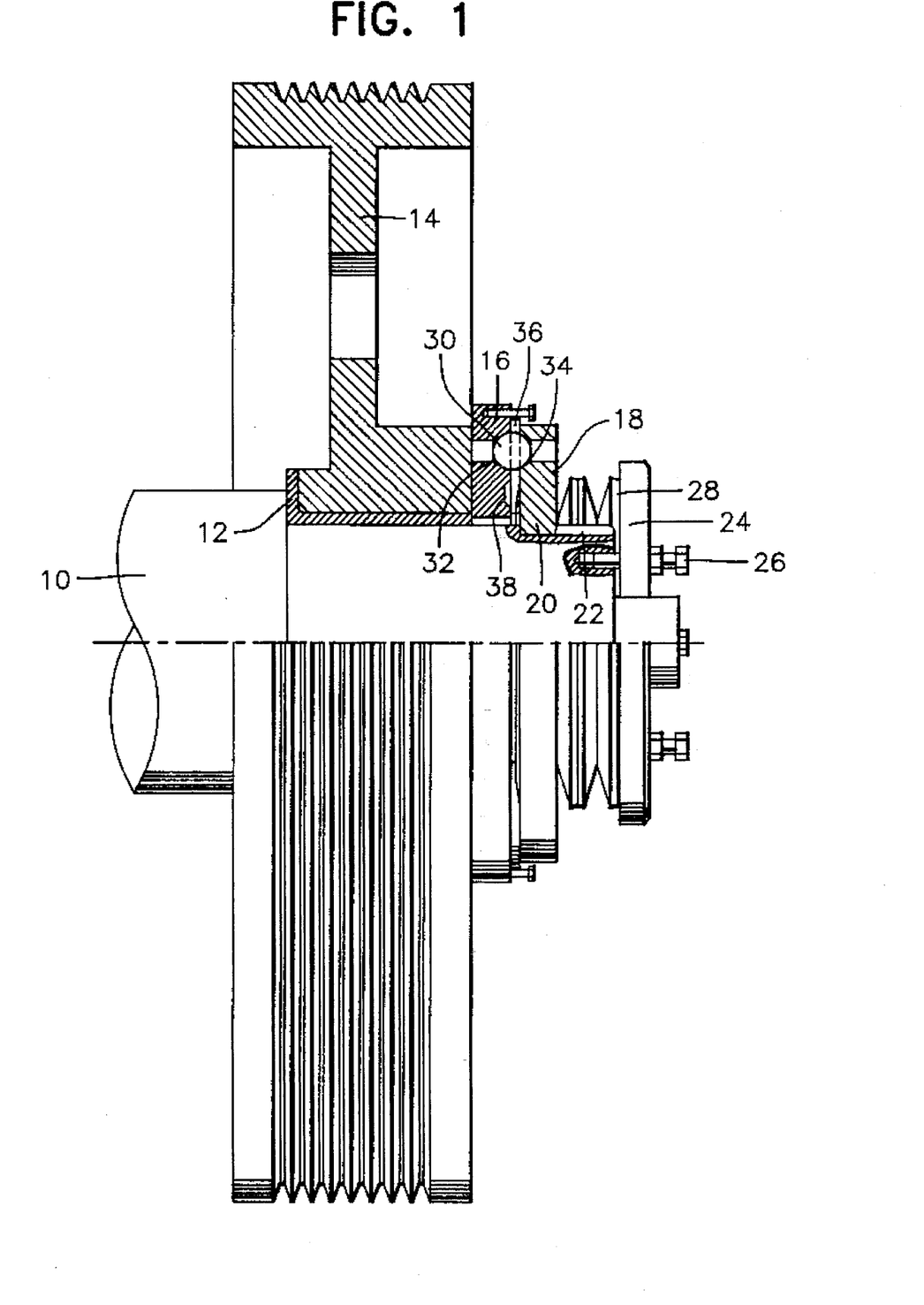
FIG. 1 is a parallel cross-section view of an embodiment of the inventive overload protection device in the engaged state.

A drive shaft 10 is shown in FIG. 1 (which shaft may be, e.g., a takeoff shaft) and is driven by a drive motor (not shown). A bronze bearing 12 is disposed on the perimeter of the drive shaft. A belt pulley 14 is rotatably mounted on the bearing 12, which pulley 14 serves to drive the operating machine which may be, e.g., a movable crushing jaw of a double-toggle-joint jaw crusher or of a single-toggle-joint jaw crusher. A driven coupling disc (in the form of a clutch disc) 16 is fixed to the belt pulley 14 by bolts. On the other side, a driving coupling disc (in the form of a clutch disc) 18 is connected to the drive shaft 10 by means which are rotationally rigid (fixed against relative displacement in the rotational direction). Because the driving disc 18 must be movable along the axis of the drive shaft 10, the rotational engagement occurs by interengagement of a protuberance (or the like) 20 disposed on the inner circumference of disc 18 with a corresponding longitudinal groove 22 on the outer circumference of the drive shaft 10.

It goes without saying that the drive shaft 10, the bronze bearing 12, the belt pulley 14, and the two coupling discs 16,18 all have a common axis.

A pressure plate 24 is fixed to the end of the drive shaft 10 by means of an adjusting bolt 26. The diameter of the pressure plate 24 is greater than that of the drive shaft 10, so that a compression spring 28 (here in the form of a stack of cup springs) can be installed between the plate 24 and the side of coupling disc 18 which faces away from coupling disc 16. It is evident that the force of the compressive spring(s) 28 on the coupling disc 18 may be reduced by loosening the adjusting bolt 26, and may be increased by tightening the bolt.

Rolling elements 30 are provided for force-interlocking connection of the two coupling discs 16,18. These rolling elements lie in depressions 34 in the surface of coupling disc 18 which faces coupling disc 16.

The rolling elements 30 may have any of various geometric shapes, the simplest being a sphere. The number of rolling elements 30 chosen to be used for force transmission is also subject to election; however, it is advantageous to dispose three rolling elements in spherical form at equiangular separations of about 120°. With this disposition the spheres are equally loaded. For applications with high loads, the rolling elements 30 may be manufactured from ball bearing steel, followed by heat treating and polishing.

Advantageously the coupling discs 16,18 are also heat treated and are nitride-hardened or case-hardened.

Clearly if the rolling elements 30 are spheres the seats for the rolling elements, in the form of depressions 32, are relatively easy to fabricate. It can be seen in FIGS. 1 and 2 that the depressions 32 in the driven coupling disc 16 have a depth such that the penetration of the rolling elements 30 into the depressions 32 is to the extent of half the diameter of the elements 30. Correspondingly, the opposing depressions 34 in the driving coupling disc 18 are shallower, since naturally the coupling discs 16 and 18, which are coupled essentially by the rolling elements 30, have a certain separation, and in addition a guide race 36 for the rolling elements 30 must be accommodated in the gap between discs 16 and 18. The guide race 36 forcefully maintains the rolling elements 30 at their equiangular separation, but by appropriate form of the opening in the race it allows a certain radial movement of the rolling elements 30.

Figure 3A:
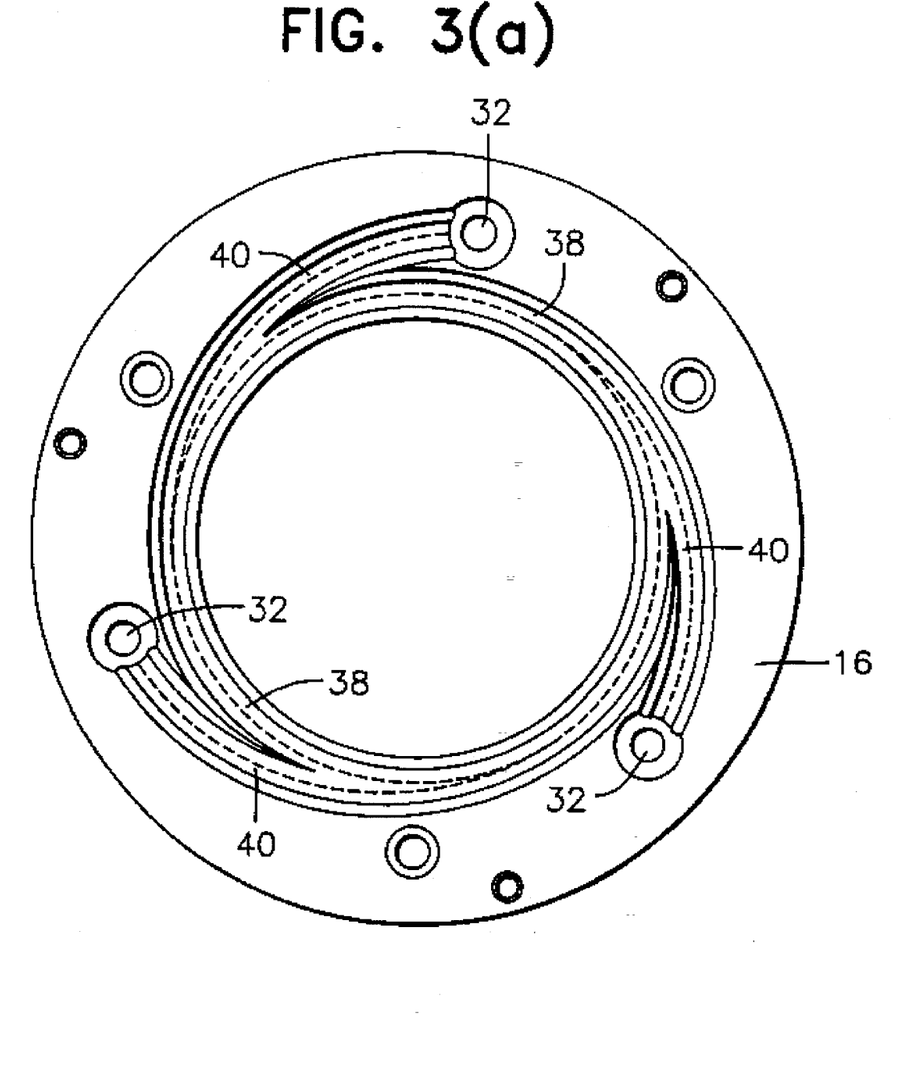
FIGS. 3(a) and 3(b) respectively are a plan view and a side view of the structure of the guide grooves in the mutually facing surfaces of the coupling parts showing only one coupling part which surface is directed toward the second coupling part.
Figure 3B:
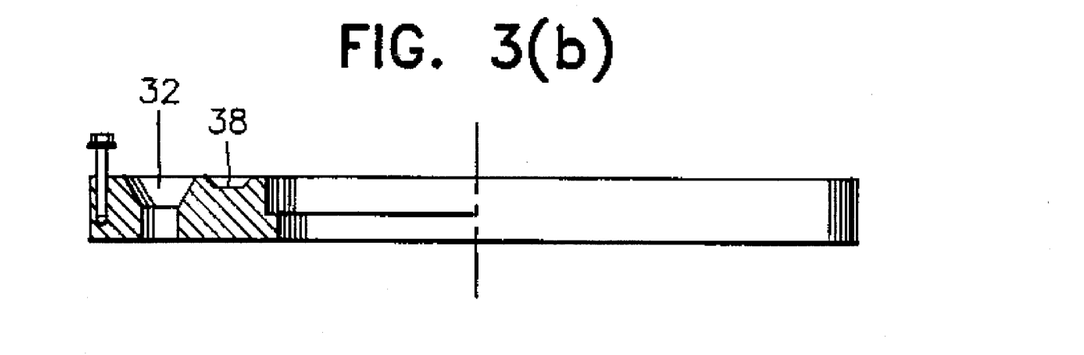
Figure 4A:
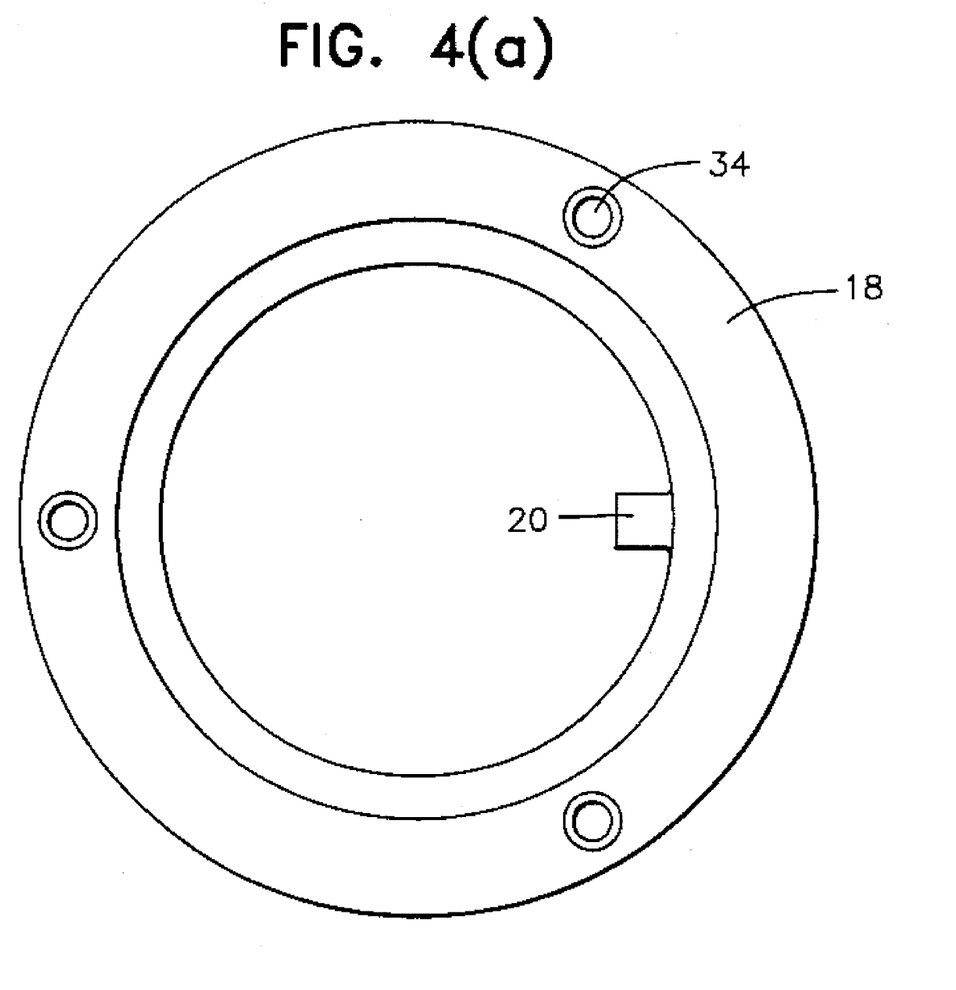
FIGS. 4(a) and 4(b) respectively are a plan view and a side view in partial cross-section of the structure of a preferred embodiment of the oppositely disposed coupling part, showing the structures for receiving the rolling elements.
Figure 4B:
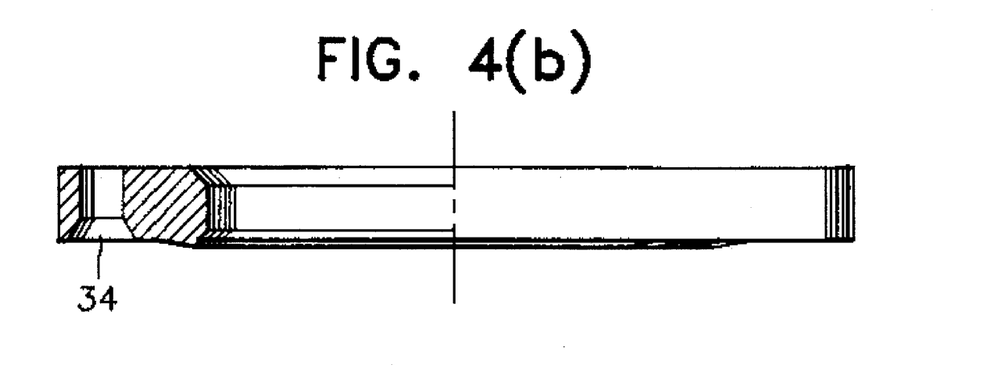

FIGS. 3(a) and 3(b) show that the coupling disc 16 which, in this particular embodiment has three depressions 32, corresponding to three rolling elements 30. It may also be seen that in the surface of the coupling disc 16, which surface is directed toward coupling disc 18, a guide groove 38 is formed which is circular, i.e., has a ring shape in the plane of the disc 16. As shown, the diameter of the circular guide groove 38 is less than that of the virtual circle on which the depression 32 are disposed. The guide groove 38 is connected to the depressions 32 via spiral guide grooves 40 for the rolling elements 30, which grooves 40 open tangentially out from groove 38.

The overload protection device operates as follows:

First, with the device in the engaged position according to FIG. 1, the limiting torque or the limiting force of the force-interlock is set by appropriate adjustment of the compressive spring force of the compression spring 28, with the aid of the adjusting bolts 26. It is obvious that the prestressing device which urges coupling disc 18 toward coupling disc 16 may be realized in other forms, e.g., with the use of different kinds of springs, or in the form of a pneumatic or hydraulic device.

If the pulley 14 is now abruptly stopped by blocking the operating machine the limiting force of the force-interlock of the coupling (18, 30, 16) is exceeded, and the rolling elements 30 move out of their respective depressions 32 and onto the circular guide groove 38, via the spiral grooves or guideways 40. Obviously it is possible to have a guide groove 38 disposed outwardly instead of inwardly with respect to the depressions 32. Also, the connecting grooves or guideways 40 from the depressions 32 to the guide groove 38 need not have a spiral shape as shown in FIG. 3, but may be of other conceivable circular, spiral or tangential shapes.

The rolling elements 30 execute rolling motion when leaving the depressions 32, continuing by traversing the spiral grooves 40, and proceeding into and along the guide groove 38. Thus at no point during the disengaging process of the coupling does appreciable friction occur; rather the movement of the rolling elements 30 is a clean, defining rolling movement. A critical factor in this is the structural shape of the seats for the rolling elements 30, namely the depressions 32. The angle of these should not exceed a certain value, in order to ensure clean, controllable, and uniform, e.g., simultaneous, release of all three rolling elements 30, and to avoid momentarily excessive pressing forces during the initial part of the departure of the rolling elements from the depressions and into the grooves 40.

A proper movement of the rolling elements 30 out of the depressions and toward the guide groove 38 is promoted by a suitable cross-sectional shape of the grooves 40 and the circular guide groove 38; and the shape will later have a favorable influence on the reverse process wherein the rolling elements are restored to the depressions 32. The cross-sectional shape of the grooves 40 should be chosen based on the guiding properties sought, with a major factor being the minimization of friction, another being optimization with regard to manufacturing technology, and a third being the desirability of avoiding "chattering" of the type which is so detrimental when simply-constructed toothed couplings are employed.

Figure 2:
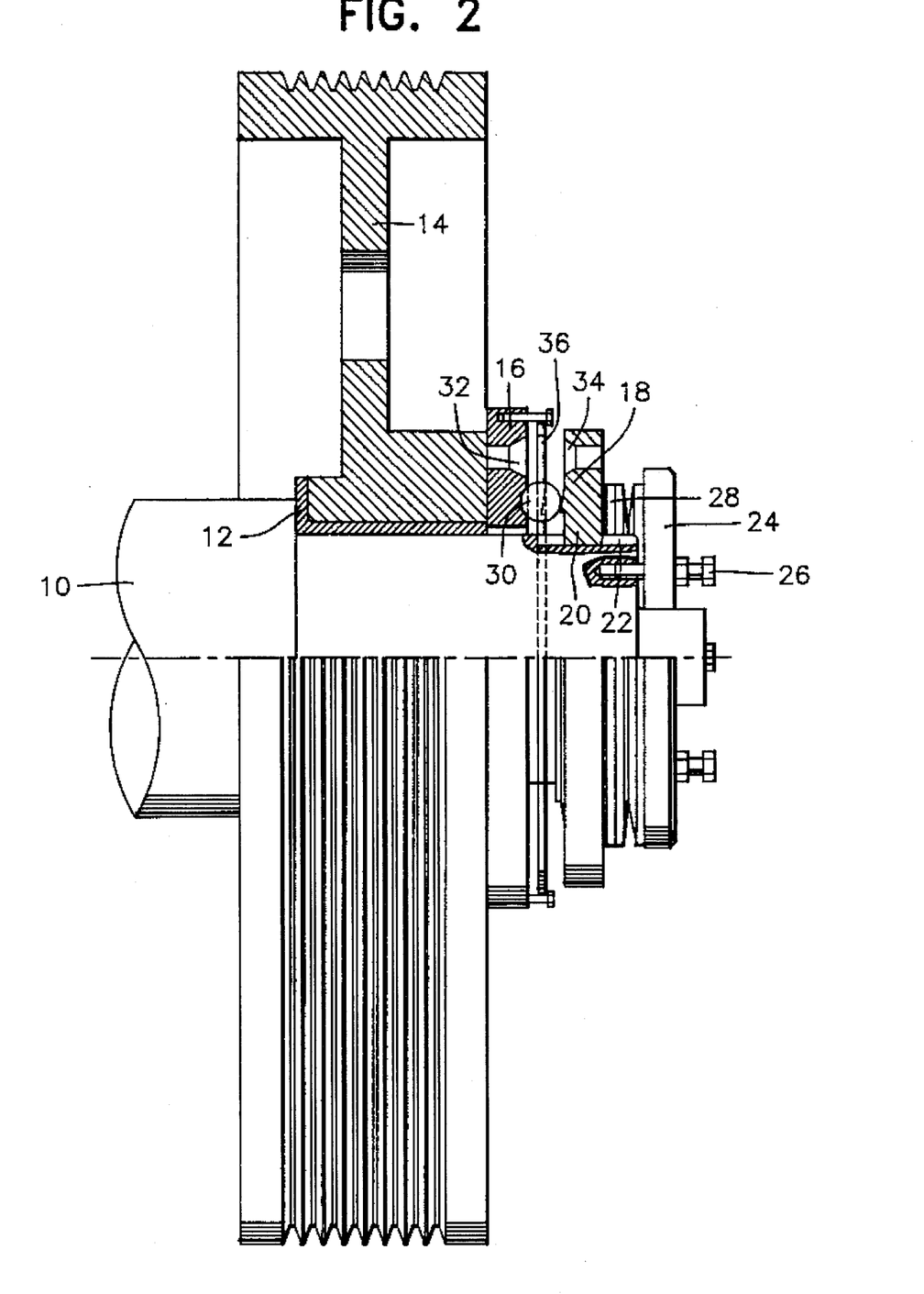
FIG. 2 is the embodiment of FIG. 1 in the disengaged state.

It is evident that when the described releasing process occurs the distance between the coupling discs 16,18 increases, and thus coupling disc 18 must give way, moving away from coupling disc 16, in the course of which the compression spring 28 becomes compressed, as seen clearly in FIG. 2.

It is further evident that after the release of the overload protection device (thus after uncoupling of the coupling), the driven parts of the device (namely, those on the operating-machine side of the coupling) rotate more slowly or even come to a rapid stop. Thus, a difference in rotational angular velocity develops between the angular velocity of the drive shaft 10 and the angular velocity of the belt pulley 14. This difference in angular velocity is possible because of the presence of the bronze bearing 12.

Figure 5A:
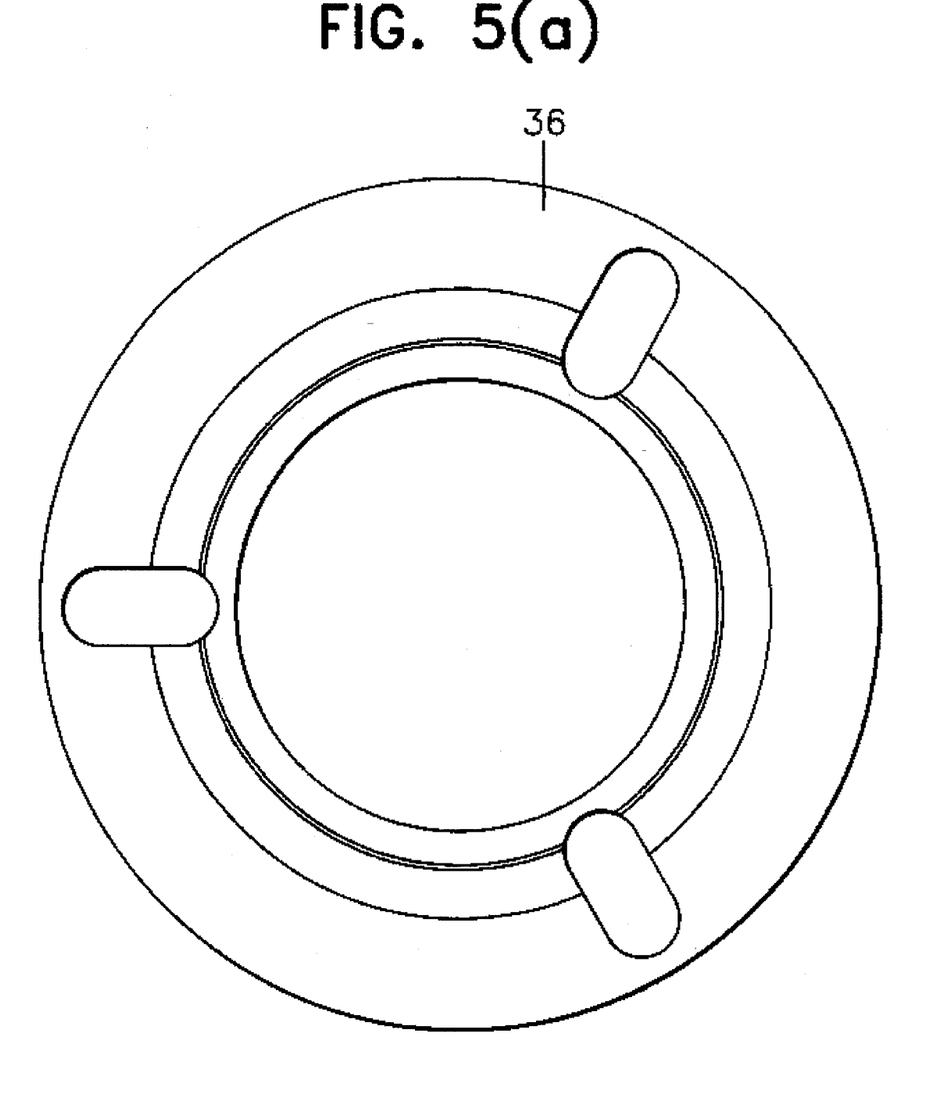
FIGS. 5(a) and 5(b) respectively are a plan view and a side view in partial cross-section of the race ("guide disc") for the rolling elements.
Figure 5B:
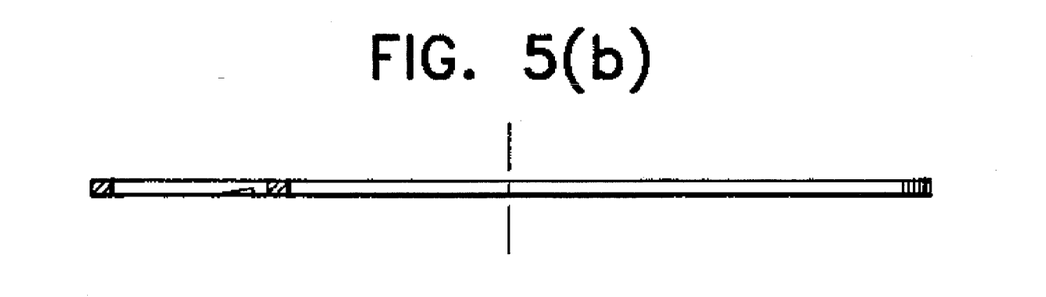

Once the coupling is disengaged, the two coupling discs 16,18 operate like outer races of an axial bearing. Thus, the coupling does not transmit appreciable torque, either by force-coupling means (non-positive means such as friction) or by form-interlocking means (positive means such as gears, spur gears or claws). In the disengaged state the rolling elements are kept spaced equidistantly, i.e., equiangularly, during the movement of the rolling elements 30 out of the depressions 32 and toward and into the guide groove 38, by means of the guide race 36 shown in FIGS. 5(a) and 5(b). The guide race 36 serves a function similar to that of the bearing race of a ball bearing.

When the source of blockage has been removed, the coupling must be reengaged. For this purpose, the rolling elements 30 must move out of the circular guide groove 38 and reassume their positions in the respective depressions 32.

To achieve this it is sufficient to reverse the drive motor. The rolling elements 30 will then tend to roll out of the circular guideway in the guide groove 38, either due to suitable configurations of the cross sections of the grooves or due to centrifugal force; thus when the drive motor is reversed the rolling elements 30 will automatically return over the grooves 40 to the depressions 32. At this point the coupling will be back in the engaged state, and the operating machine can then be returned to operation without further delay, merely by reversing the drive motor once again.

I claim:

1. A mechanical overload protection device for an operating machine driven by a drive motor having, included in a drive train thereof, an overload protection means which acts in response to a mechanical overload to uncouple the machine from the drive motor wherein the overload protection means comprises:

a first coupling part and a second coupling part, said coupling parts having mutually facing surfaces, said surfaces provided with depressions for accommodating a plurality of coupling bodies, a guide means which connects with said depressions and comprises a circular guide groove having a guideway which is circular, arcuate or spiral and which opens tangentially out from said circular guide groove and terminates in said depressions;

a plurality of coupling bodies which, when in a coupled condition, provide a force-interlock between said first and second coupling parts, wherein said coupling bodies are held in said respective depressions, said depressions being circular grooves having a diameter which is greater than a diameter of the said circular guide groove; and a biasing means supplying a threshold force of said force-interlock between said coupling parts, such that when said threshold force is exceeded the coupling bodies are in a disengaged condition whereby said coupling bodies move into said guide groove thereby releasing said force-interlock between said coupling parts so that said coupling parts are rotatable relative to each other.

2. The mechanical protection overload device of claim 1 wherein there are three coupling bodies.

3. The mechanical protection overload device of claim 1 wherein said coupling bodies are spherical rolling elements.

4. The mechanical protection overload device of claim 1 wherein said guide groove is formed in the surface of said first coupling part.

5. The mechanical protection overload device of claim 1 wherein said guide groove is formed in the surface of said second coupling part.

6. The mechanical protection overload device of claim 1 further comprising a guide race which provides an equiangular separation between the coupling bodies in any operating state.

7. The mechanical protection overload device of claim 1 wherein the first coupling part and the second coupling part are each a clutch disc.

8. The mechanical protection overload device of claim 7 wherein one of said clutch discs is connected to a drive shaft and is axially moveable and biased through action of said biasing means with respect to said drive shaft but is fixed against rotation with respect to said drive shaft, and said other clutch disc is rotatably mounted on said drive shaft.

9. The mechanical protection overload device of claim 1 wherein the biasing means is a spring.

10. The mechanical protection overload device of claim 1 wherein said guideway has a depth which is shallower than a depth of said depressions and a shape which is spiral, arcuate or circular.

11. The mechanical protection overload device of claim 1 wherein said depressions in said second coupling part are shallower than said depressions in said first coupling part.

12. The mechanical protection overload device of claim 1 wherein said first coupling part is rotatably mounted on a drive shaft and is rigidly connected to a drive belt-pulley.

* * * * *

UNITED STATES PATENT AND TRADEMARK OFFICE
CERTIFICATE OF CORRECTION

PATENT NO. : 5,542,884

DATED : August 6, 1996

INVENTOR(S) : Bruno GOTZ

It is certified that error appears in the above-identified patent and that said Letters Patent is hereby corrected as shown below:

On the title page: Item

[30] "9313633U" should be --9313663.3U--

Signed and Sealed this

Eighteenth Day of August, 1998

Attest:

BRUCE LEHMAN

Attesting Officer     Commissioner of Patents and Trademarks